US008447668B2

(12) United States Patent
Jentoft

(10) Patent No.: US 8,447,668 B2
(45) Date of Patent: May 21, 2013

(54) AUDIO-EQUIPPED TRANSACTION CARD SYSTEMS AND APPROACHES

(76) Inventor: Keith Jentoft, Circle Pines, MN (US)

( * ) Notice: Subject to any disclaimer, the term of this patent is extended or adjusted under 35 U.S.C. 154(b) by 1949 days.

(21) Appl. No.: 11/036,591

(22) Filed: Jan. 14, 2005

(65) Prior Publication Data

US 2005/0177484 A1      Aug. 11, 2005

Related U.S. Application Data

(60) Provisional application No. 60/537,165, filed on Jan. 16, 2004, provisional application No. 60/537,163, filed on Jan. 16, 2004.

(51) Int. Cl.
*G06Q 40/00*      (2012.01)
(52) U.S. Cl.
USPC ............................................. 705/35
(58) Field of Classification Search
USPC ........................ 705/35, 44, 21, 24
See application file for complete search history.

(56) References Cited

U.S. PATENT DOCUMENTS

| | | | | |
|---|---|---|---|---|
| 4,677,657 A * | 6/1987 | Nagata et al. | ............... | 455/558 |
| 4,827,518 A * | 5/1989 | Feustel et al. | ............... | 704/246 |
| 4,851,654 A * | 7/1989 | Nitta | ............... | 235/492 |
| 5,479,562 A * | 12/1995 | Fielder et al. | ............... | 704/229 |
| 5,539,819 A * | 7/1996 | Sonoyama et al. | ...... | 379/357.03 |
| 5,583,933 A * | 12/1996 | Mark | ............... | 379/357.04 |
| 5,825,871 A * | 10/1998 | Mark | ............... | 379/357.03 |
| 5,859,913 A | 1/1999 | Goreta et al. | | |
| 5,963,643 A | 10/1999 | Goreta et al. | | |
| 6,084,967 A * | 7/2000 | Kennedy et al. | ............. | 380/247 |
| 6,098,053 A * | 8/2000 | Slater | ............... | 705/44 |
| 6,236,724 B1 * | 5/2001 | Labaton et al. | .......... | 379/357.03 |
| 6,327,365 B1 * | 12/2001 | Kiger, II | ............... | 379/357.03 |
| RE37,660 E * | 4/2002 | Talton | ............... | 379/355.05 |

(Continued)

FOREIGN PATENT DOCUMENTS

| EP | 0 787 398 B1 | | 6/2001 |
|---|---|---|---|
| EP | 1 008 256 B1 | | 7/2003 |
| WO | WO 02/014974 | * | 8/2001 |
| WO | WO 02/14974 | * | 2/2002 |

OTHER PUBLICATIONS

CNN.com / SCI-TECH with IDG.net: New security card lets your wallet do the talking, Jun. 11, 2001, pp. 1-2.*

(Continued)

*Primary Examiner* — Bijendra K Shrestha
(74) *Attorney, Agent, or Firm* — Crawford Maunu PLLC

(57) ABSTRACT

Approaches for using and implementing transactions involving audio-equipped transaction cards reduce both data-management efforts and costs. In addition, certain applications further facilitate loyalty to the business entity that issues the audio-equipped transaction cards by, e.g., facilitating transactions with the card-issuing entity and/or selected business partners. One example embodiment is directed to audio-equipped personal cards and an approach to purchase agreement that involve activating an audio transmission from a transaction card to establish a point-of-sale purchase agreement. Data relating to the purchase agreement is communicated to an account/payment institution to confirm the purchase agreement, optionally in response to the customer's PIN being received. In another embodiment, a two apparatus (or "card") approach involves retailers entering data via a retailer card that is useable by selected users (e.g., the retailer's representatives or employees). For such retailer and/or customer cards, various implementations are directed to different approaches for entering user information and/or security information such as customer PIN, a retailer-employee ID or PIN number.

18 Claims, 2 Drawing Sheets

U.S. PATENT DOCUMENTS

| | | | |
|---|---|---|---|
| 6,377,670 B1 | 4/2002 | Rosset et al. | |
| 6,421,445 B1* | 7/2002 | Jensen et al. | 380/253 |
| 6,445,780 B1 | 9/2002 | Rosset et al. | |
| 6,487,540 B1* | 11/2002 | Smith et al. | 705/21 |
| 6,581,035 B1* | 6/2003 | Madan et al. | 704/273 |
| 6,607,136 B1* | 8/2003 | Atsmon et al. | 235/492 |
| 6,708,892 B2* | 3/2004 | Smith, II | 235/492 |
| 7,174,323 B1* | 2/2007 | Schultz et al. | 705/75 |
| 7,251,730 B2* | 7/2007 | Rose et al. | 713/176 |
| 7,283,973 B1* | 10/2007 | Loghmani et al. | 705/26 |
| 7,481,363 B2* | 1/2009 | Zuili | 235/380 |
| 2002/0191765 A1* | 12/2002 | Labaton | 379/201.01 |
| 2003/0046554 A1* | 3/2003 | Leydier et al. | 713/186 |
| 2003/0120626 A1* | 6/2003 | Piotrowski | 707/1 |
| 2003/0229492 A1* | 12/2003 | Nolan | 704/247 |
| 2005/0075985 A1* | 4/2005 | Cartmell | 705/67 |
| 2007/0112775 A1* | 5/2007 | Ackerman | 707/9 |

OTHER PUBLICATIONS

Wilmott, Don: Sounds Like Safe Surfing, Computer Shopper, Nov. 1, 2000, pp. 1-2.*

Bakker, Bastiaan: Mutual Authentication with Smart Cards, May 10-11, 1999, USENIX Workshop on Smartcatd Technology, Chicago, Illinois, pp. 1-13.*

* cited by examiner

AUDIO-EQUIPPED TRANSACTION CARD SYSTEMS AND APPROACHES

RELATED PATENT DOCUMENTS

This is a conversion of the following U.S. Provisional Patent Applications: Ser. No. 60/537,165 (JENT.002P1) filed on Jan. 16, 2004 and entitled "AUDIO-EQUIPPED PERSONAL CARD SYSTEMS AND METHODS OF THEIR USE;" and Ser. No. 60/537,163 (JENT.003P1) filed on Jan. 16, 2004 and entitled "RETAILER-LOYALTY AUDIO-EQUIPPED PERSONAL CARD SYSTEMS AND METHODS OF THEIR USE." Priority to each of these provisional applications is claimed under 35 U.S.C. §119 for common subject matter.

FIELD OF THE INVENTION

The present invention relates, in general, to electronic commerce and, more particularly, to secure personal transactions using audio-equipped personal cards.

BACKGROUND OF THE INVENTION

Identity theft and the fraudulent use of banking information have become rampant among various facets of the world's economy. Retailers and customers have increasing needs for simple, easy, and trustworthy point-of-sale transactions. Various efforts, e.g., as described in U.S. Pat. No. 5,963,643 to Goreta et al. (hereby incorporated herein by reference), have been directed to approaches for transferring information. Other previous efforts for point-of-sale telephony-based transactions have used an ID associated with a telephone (such as an associated cell phone number or a bar label on a mobile telephone ID) as a tool for identifying the customer using the telephone.

Such previous efforts are useful to fulfill the desire of retailers and customers for easy and trustworthy point-of-sale transactions. However, the costs of implementing such point-of-sale transactions and others can inhibit their implementation and widespread use. In this regard, point-of-sale transactions continue to suffer from undesirable characteristics including those discussed above.

SUMMARY

The present invention is directed to overcoming the above-mentioned challenges and others related to the types of devices and applications discussed above and in other applications. The present invention is exemplified in a number of implementations and applications, some of which are summarized below.

According to an example embodiment of the present invention a transaction card is configured for audio communication. Transaction-related information, such as account information, user identification, authentication and/or security information is stored at the transaction card. This audio information is implemented for processing transactions for the user to which the card is assigned, such as typically implemented for conventional credit cards, debit cards and other purchase cards.

In another example embodiment of the present invention, a business transaction involving personal transaction cards is carried out using an approach involving the communication of audio information. Audio information is stored with a transaction card. When the transaction card is used for a transaction, the audio information is communicated from the transaction card. The communicated audio information is used in authorizing the transaction.

According to another example embodiment of the present invention, a transaction processing system is programmed and configured for processing transactions using audio information stored on a transaction card. The system implements one or more transaction cards having stored audio information and used, e.g., at point-of-sale transactions. A communications arrangement (e.g., a transaction card reader implemented with an audio receiver and transmitter) communicates audio from the transaction card in connection with a particular transaction. The system authorizes the transaction as a function of the communicated audio information.

In another example embodiment of the present invention, a transaction card device is configured for processing transaction information with audio-equipped transaction cards. The transaction card reader is adapted to read audio information from a buyer's transaction card, and an audio communications device is adapted to audibly communicate the read audio information to a retailer. The communicated audio information includes information for authorizing the transaction, with the audio information used by the retailer (or an associated entity) in processing the transaction.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
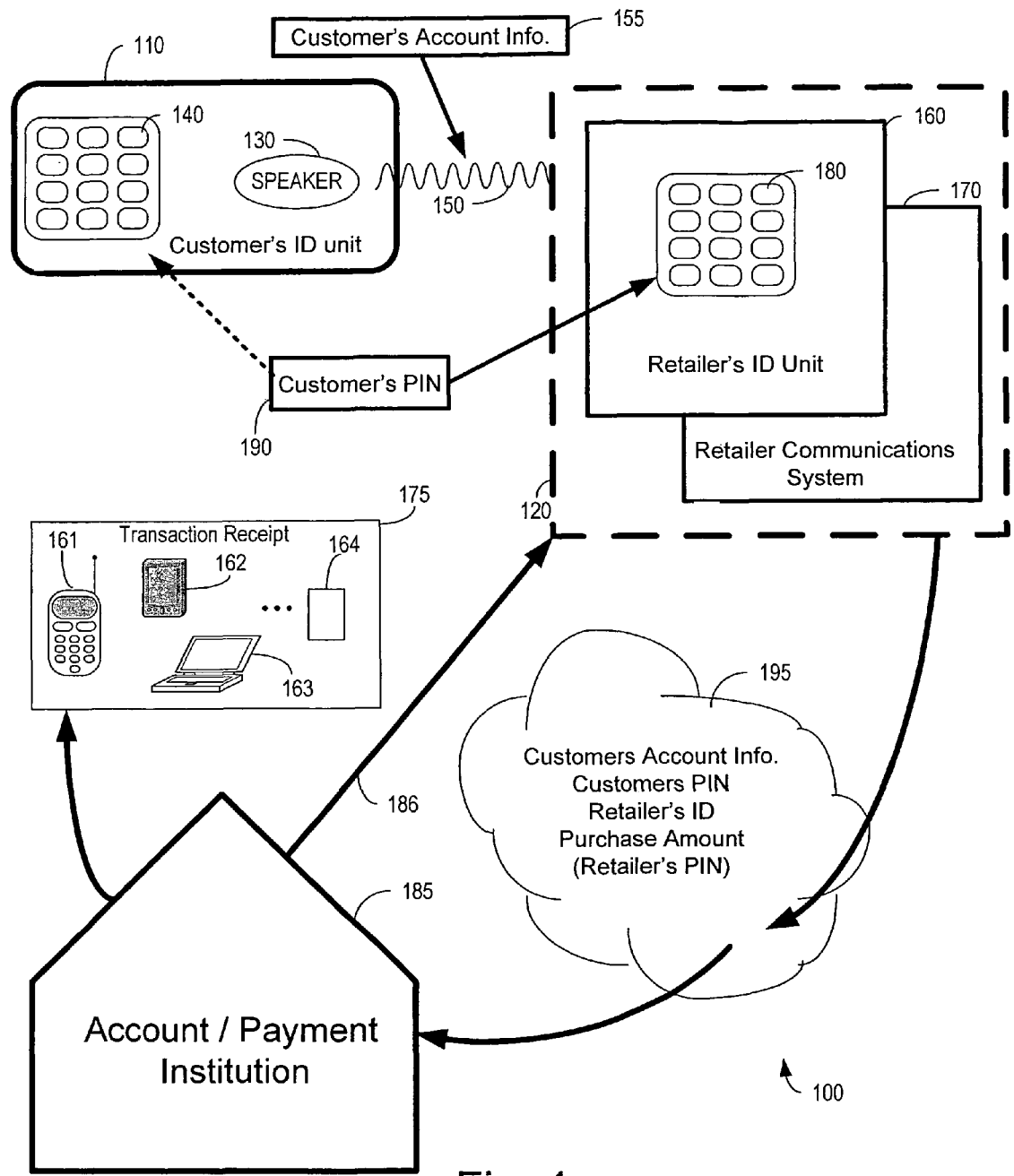
FIG. 1 is a block diagram showing an example system and example methodology involving use of audio-equipped personal cards, according to the present invention.

The above summary of the present invention is not intended to describe each illustrated embodiment or every implementation of the present invention. The figures and detailed description that follow more particularly exemplify these embodiments.

DETAILED DESCRIPTION

The present invention is believed to be applicable to a variety of different types of communications and financial process management approaches, and has been found to be particularly useful for applications involving the implementation and application of payment-related transaction processes and related aspects thereof. While the present invention is not necessarily limited to such approaches, various aspects of the invention may be appreciated through a discussion of various examples using these and other contexts.

Approaches involving audio-equipped personal cards in accordance with various aspects of the present invention may incorporate one or more of the features, structures, methods or combinations thereof described herein. For example, a point-of-purchase agreement and verification system may be implemented to include one or more of the features and/or processes described below. It is intended that such approaches need not necessarily include all of the features and functions described herein, but may be implemented to include one or more features and functions that, alone or in combination, provide for structure and/or functionality.

According to an example embodiment of the present invention, an audio-equipped personal card system includes one or more self-contained audio-equipped personal devices capable of audio transmission of commerce information over available communications infrastructure. In certain specific example embodiments, each audio-equipped personal card includes at least partially encrypted customer-account information (e.g., at least a customer account and/or a key for accessing the database) and, optionally, a customer-verification encoding port is implemented for entering the customer's Personal Identification Number ("PIN").

In other example embodiments, each audio-equipped personal card includes information with encryption. Once the link to a back-end institution is established (e.g., using the above-discussed key for access), as with conventional credit/debit and other billing card transactions, the back-end institution uses the customer account number to access its database and thereby retrieve other customer particulars such as name, communication addresses (email or otherwise) for receipting purposes, monetary and card-user authorization limits.

An audio-equipped personal card system is implemented with phone payment approaches (systems and/or methods) in connection with other example embodiments of the present invention. A purchasing retailer-customer at a front-end of the system uses an audio-delivering encrypted "payment card," such as a credit or debit card, to request authorization and verification that the issuing-card (payment) institution at a back-end of the system will pay a retailer for the purchasing retailer-customer's purchase.

In another example embodiment, each audio-equipped personal card includes customer-account information and, optionally, a customer-verification encoding port for entering the customer's Personal Identification Number ("PIN"); the cards may be generated with customer numbers randomly programmed into the cards wherein the cards are issued and registered to a customer with the customer information subsequently being associated with this random number data. In this embodiment, the audio information on the card may be generally limited to specific card information with the customer information being stored on a secure server that is associated with the card-programmed information.

Accordingly, certain embodiments of the present invention are directed to phone payment approaches (systems and/or methods) in which the purchasing retailer-customer front-end uses an audio-delivering (optionally, encrypted "payment card") such as a credit or debit card, to request authorization and verification that the issuing-card (payment) institution back-end will pay retailer for the customer's purchase.

Another example embodiment of the present invention is directed to an audio commerce information transmission approach involving a purchase agreement using at least one audio-equipped personal card. A first audio transmission is activated from a first card to establish a point-of-sale purchase agreement, and the agreement is transmitted to an account/payment institution to confirm the purchase agreement. The transmission occurs over an available communications infrastructure, such as the Internet or a telephone channel, using an innocuous (or generic) communications terminal; in this context, the transaction is implemented without necessarily processing terminal-identification data and therefore without necessary dependence upon the communications terminal identification (ID) or the communications network provider.

In connection with another embodiment of the present invention, a two apparatus (or "card") approach allows the retailer to enter its data via a common retailer card that is useable by each of various employees of the retailer or via one of a plurality of respectively retailer-allocated employee cards. For such retailer cards, an employee ID or PIN number and a retailer ID or PIN number may be manually keyed or otherwise entered.

In another example embodiment, the two apparatus approach involves the use of the customer card and, instead of a retailer "card," a retailer terminal that can link to the account/payment institution and provide the necessary retailer data. In a more specific implementation, the retailer terminal includes an input port (such as a microphone or card reader) for receiving the customer card data (and optionally the customer's PIN) before transmitting the entire set of retailer-customer transaction data over the communications network for the purchase. The retailer terminal can include data-entering tools (e.g., numerically-designated and/or pre-programmed keys) for permitting the employee and/or customer to enter transaction pricing information as well as optional PIN number(s) for the customer and/or retailer.

The retailer (or other business entity) permits such customer-card business transactions to be conducted over multiple business channels in connection with other embodiments of the present invention. Such business channels include, for example, in store purchases, catalog mail-in or call-in purchases, and store web-site purchases.

In another example embodiment of the present invention, customer cards facilitate a loyalty-inducing approach for business with a business entity issuing the customer cards. The business entity can be, for example, a mall, retailer, chain store or other association of retailers, issues special cards to customers that permit purchases to take place over one or more business channels (in store, catalog mail-in or call-in, store web-site), but with only that particular card-issuing business entity. The customer card transmits a customer ID that is unique and useful only for purchases with the business entity and/or with its designated business partners.

In another embodiment involving a loyalty approach as discussed above, the customer card is programmed with data for granting permission to make purchases over multiple channels, with a business entity and/or with its designated business partners in connection with the card. A non-limiting non-exhaustive list of channels includes on-line web purchases; printed catalog purchases; non-catalog telephone call-in purchases; and in person purchases.

In another embodiment, the customer card includes data that facilitates (e.g., authorizes or otherwise permits) purchases over one or more of specific telephony-connected channels and only with the business entity and/or with its designated business partners. The customer card is issued with a toll-free telephone number for which DTMF audio tones are generated for reception into the microphone of the telephone handset and, in response, the specific telephony connection is made and the customer then enters the customer PIN for verification. A non-limiting non-exhaustive list of channels includes dial-up on-line web purchases; printed catalog purchases; non-catalog telephone call-in purchases; and in person purchases.

In another related embodiment, the customer card includes data that permits purchases over one or more of specific non-telephony-connected channels with the business entity and/or with its designated business partners. The customer card is issued with link-connecting audio (DTMF, MF or otherwise) tones that are generated for reception into a microphone of an audio-data compatible terminal (such as a digital mobile telephone or other data terminal) and, in response to recognizing the specific tones, the audio-data compatible terminal establishes a connection to a communications network. This connection is followed by the customer entering the customer PIN for verification. A non-limiting non-exhaustive list of channels includes on-line web purchases; printed catalog purchases; non-catalog telephone call-in purchases; and in person purchases.

For some or all of these embodiments, pricing data and any needed retailer information for the business entity can be entered via the customer card (if so equipped or via the audio-data compatible terminal). For example, the customer audio cards can be equipped with various user-interface ports for entering important information. In one such more specific embodiment, customer-verification is provided using a biometric sensor (such as a fingerprint detector). In another such specific embodiment, customer-verification as well as pricing data is provided using a micro-keypad.

In yet another embodiment, the customer audio card is equipped with such a small data-entering tool to permit entering the customer PIN and, in response to recognizing/verifying the customer PIN, the card electronics activate the card-equipped data to be audibly transmitted from the card.

In connection with each of the above embodiments, the customer audio cards can be equipped with various user-interface ports for entering important information. In one such more specific embodiment, customer-verification is provided using a biometric sensor (such as a fingerprint detector). In another such specific embodiment, customer-verification as well as pricing data is provided using a micro-keypad.

In yet another specific embodiment, the customer audio card is equipped with such a small data-entering tool to permit entering the customer PIN and, in response to recognizing/verifying the customer PIN, the card electronics activate the card-equipped data to be audible transmitted from the card.

In another specific example embodiment, the customer card (and, where applicable, the retailer card) includes a built-in keypad on which the user enters the PIN and the tone (carrying the card information) is emitted only after the user enters the correct PIN number. In this embodiment, the card electronics are preprogrammed with the PIN number (e.g., via firmware programming, fully- or semi-programmable nonvolatile memory).

In yet another embodiment, the customer audio card is equipped with such a small data-entering tool to permit entering the customer PIN, the retailer store number (and retailer PIN as well), and transaction pricing information, as well as optional PIN number(s) for the customer and/or retailer. In response to recognizing/verifying the customer PIN, the card electronics enable a protocol for receiving additional transaction-related data into a memory section of card electronics. With the communications link established, at a certain time upon completion of this additional transaction-related data (e.g., immediately, after another key prompt, or after a set delay), the card electronics activate the card-equipped data to be audible transmitted from the card for transmission over the communications link.

With regard to the above-characterized two apparatus (or "card") example, the present invention is directed to allowing the retailer to enter its data via a retailer card that is useable by each of employees or via one of respective retailer-employee cards. For such retailer cards, typically, an employee ID or PIN number and a retailer ID or PIN number are manually keyed or otherwise entered by, for example, using one of the above card-coded techniques or via a phone keypad.

In another embodiment involving a two apparatus approach, a transaction involves the use of the customer card and a terminal that can link to the account/payment institution and provide retailer data. For instance, a retailer can make available an audio-type data terminal adapted to receive audio from a customer card. The terminal and/or the card can include the data-entry tools (e.g., keys) that permit transaction-specific data to be sent to the account/payment institution and provide the transaction-receipt data.

FIG. 1 is a block diagram showing a transaction approach involving audio-equipped personal cards and their use, in accordance with another example embodiment of the present invention. An audio-equipped personal card system 100 is shown, including a customer's ID unit 110 and a retailer's system 120. The customer's ID unit 110 is shown having a speaker 130 and an activation element 140. The speaker 130 is configured to produce audio tones such as Dual-Tone Multi-Frequency (DTMF) tones useful for telephonic communication. The activation element 140 may be, for example, a single button, a multiple button keypad, a fingerprint identification system, a voice recognition actuation system, an RFID tag reader, or other system capable of activating and/or authenticating a transaction from the customer's ID unit 110.

In response to actuation of the activation element 140, the customer's ID unit 110 transmits an audio signal 150 containing at least a customer's account information 155 to the retailer's system 120. The account information 155 may, for example, be read from an audio equipped personal card read by the customer's ID unit 110 using one or more of the approaches described herein. The retailer's system 120 is illustrated having a retailer's ID unit 160 and a retailer's communications system 170.

The components shown in FIG. 1 are implemented using a variety of approaches and arrangements. For example, the retailer's system 120 may include a unit terminal having all the features of the retailer's system 120, or an assembly of components making up the retailer's system 120. The retailer's ID unit 160 may include, for example, an audio-equipped personal card similar to that implemented with the customer's ID unit 110, but providing retailer (and retailer-linking) information instead of customer information. The retailer's communications system 170 may include, for example, a cell-phone, a local-area network, a POTS, or other communication system.

The retailer's ID unit 160 may include an input device 180, such as a keypad, activation button, a handwriting recognition pad, touchpad, mouse button, or other user input system. The customer may use one or both of the activation element 140 and the input device 180 to provide a customer's PIN 190. The retailer's system 120 then assembles a data set 195 for transmission to an account/payment institution 185 to conduct a transaction. The data set 195 may include, for example, the customer's account information 155, customers PIN 190, retailer's ID number, purchase amount, and a retailer's PIN (if used).

Typically, the account/payment institution 185 responds to the retailer's system 120 with a confirmation 186. The confirmation 186 may include a confirmation number and/or a verification of sufficient funds. Upon receipt of the confirmation 186, the retailer's system 120 may issue a receipt to the customer. Optionally, a transaction receipt 175 may be sent from the account/payment institution 185 directly to the customer using, for example, a cell-phone 161, a personal digital assistant 162, a web-site 163, a pager 164, or other communications device associated with the customer's account at the account/payment institution 185.

Figure 2:
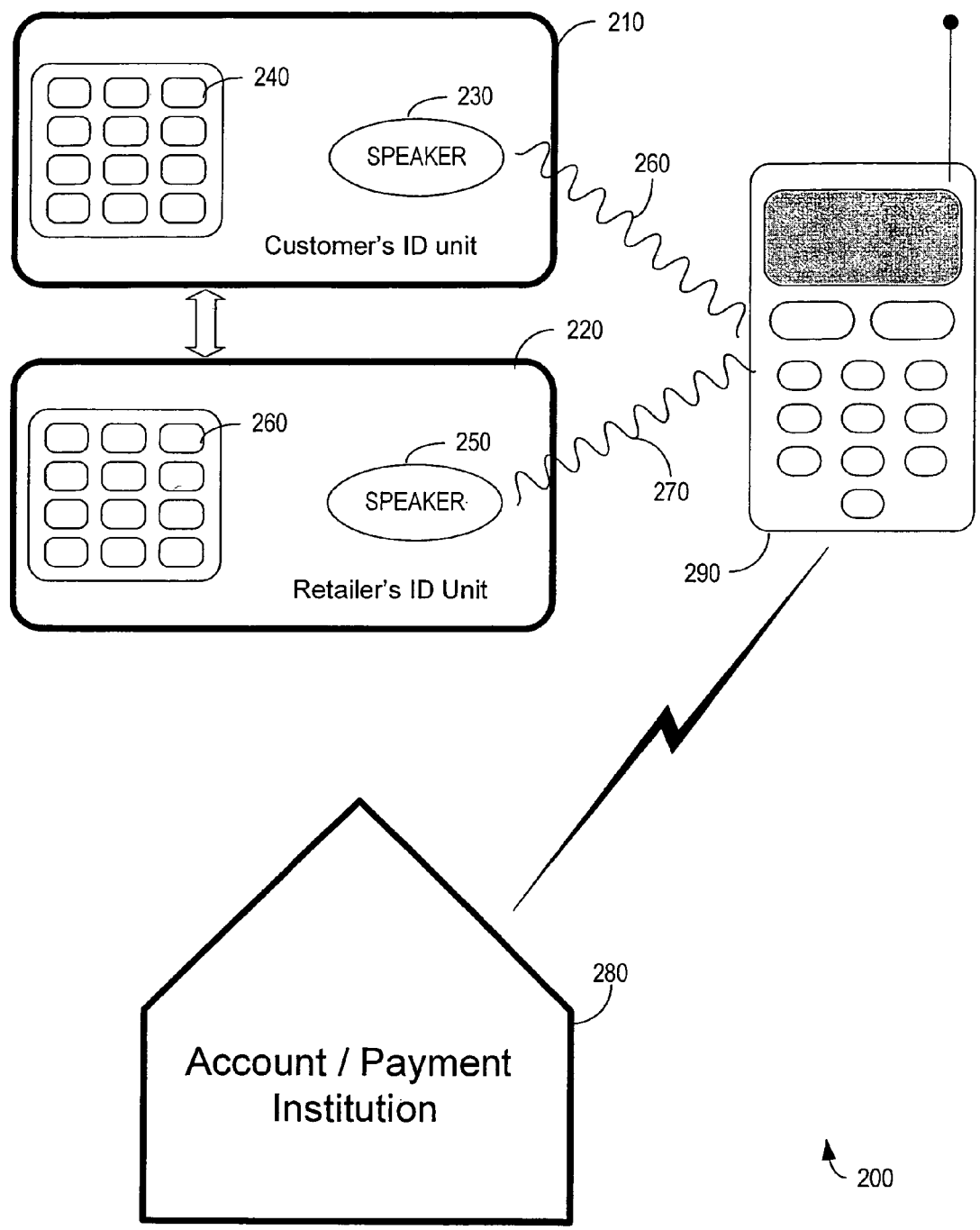
FIG. 2 illustrates another example approach for transacting a point-of-sale agreement between a customer and a retailer using two audio-equipped personal cards, also in accordance with the present invention.

FIG. 2 illustrates a system and approach for transacting a point-of-sale agreement between a customer and a retailer using two audio-equipped personal cards in accordance with one ore more example embodiments of the present invention. An audio-equipped personal card system 200 includes a customer's ID unit 210 and a retailer's ID unit 220. The customer's ID unit 210 is shown having a speaker 230 and an activation element 240. The retailer's ID unit 220 is shown having a speaker 250 and an activation element 260.

The speakers 230, 250 are configured to produce audio tones such as DTMF tones. The activation elements 240, 260 may be, for example, a single button, a multiple button keypad, a fingerprint identification system, a voice recognition actuation system, an RFID tag reader (for reading, e.g., an RFID tag on a transaction card) or other system capable of activating and/or authenticating a transaction from the ID units 210, 220.

In response to actuation of one or more of the respective activation elements 240 and 260, the ID units 210 and 220 respectively transmit audio signals 260 and 270. The audio signal 260 contains at least a customer's account information (e.g., as read from an audio-equipped transaction card) and the audio signal 270 contains at least a retailer's ID, such as an account number for the retailer, to receive a fund transfer from the customer's account. One or both of the customer's ID unit 210 and the retailer's ID unit 220 may also contain a microphone (not shown) used to record or coordinate the transaction between the customer's ID unit 210, the retailer's ID unit 220, and an account/payment institution 280.

In the example illustrated in FIG. 2, the audio signals 260, 270 are received by a cell-phone 290 for transmission to the account/payment institution 280. The audio-equipped personal card system 200 may be particularly useful for point-of-sale retailers such as mall kiosks, street vendors, and professional service providers, as well as transactions between private individuals. For example, the retailer's ID unit 220 may be adapted for use by an individual selling a personal item to another individual having the customer's ID unit 210.

Referring to both FIGS. 1 and 2, audio signals 150, 260, and 270 are encrypted or otherwise protected from eavesdropping in accordance with other example embodiments. Any frequencies, encoding, packetizing, or other data compression and/or optimization techniques can be used in accordance with the present invention.

In other example embodiments, one or more of the customer's ID unit 110, the retailer's system 120, the customer's ID unit 210, and the retailer's ID unit 220 may have memory and recording capabilities. Using a restaurant food purchase to provide an example, the retailer's system 120 and/or the retailer's ID unit 220 may be used to record the food consumed and pricing information for transmission to the account/payment institutions 185, 280. Similarly, the customer's ID units 110, 210 may be used to record the payment amount authorized, including any tip, for transfer to the restaurant's account.

In connection with one or more of the above embodiments of the present invention, the encrypted data to be exchanged between the purchasing retailer-customer front-end and the institution back-end occurs via a short-term communication link network such as a cellular network, an always-connected network, a conventional POTS (plain old telephone service) network, and various (wireless and wired) communication networks.

In some implementations, the type of encrypted data to be sent from the purchasing retailer-customer front-end to the institution back-end typically includes: customer account and/or other identification (ID) information, a customer Personal Identification Number (PIN), and retailer ID number. The PIN may be provided via biometric sensors and/or keyed in by depressing one or more keys in different coded manners such as one key via Morse code, two or more keys for a multiple digit PIN code, Radio Frequency Identification (RFID), or other verification method.

In other implementations, the type of (not necessarily encrypted) data to be returned from the institution back-end to the purchasing retailer-customer front-end typically includes: verification that purchase is authorized (i.e., sufficient funds and/or customer credit status to cover purchase) and transaction data is completed. In certain embodiments, such verification includes implementing a digital image of the customer ("should-be card holder") or other personal data to permit the retailer to prevent identify theft. Such a digital image can be returned by facsimile, embedded in an email, attached to an email, and/or for other electronic display on one or more designated terminals (e.g., the sending computer terminal or mobile phone). There may also be the return and display and/or creation of a receipt for the customer (and, optionally, such receipt can be sent before, after or concurrent with the verification data/image). In various example embodiments, the displayed receipt is "displayed" via a printed hard copy, an email to the customer, a hand written receipt and/or confirmation number, an entry on the institution's web site, a message sent to the customer's pager, a phone call and/or text message to the customer's cell-phone, or other record.

Retailer transaction-verification terminal approaches discussed herein can be implemented using conventionally-available electronics equipment with the appropriate programming to process transaction aspects that facilitate the above-described embodiments and approaches. Audio-transmitting customer and/or retailer cards can also be built using such conventionally available technology. For general information regarding such tools, as well as specific information regarding additional features that may be implemented in connection with one or more of the above-described embodiments and approaches, reference can be made to the following (U.S.-corresponding) patent documents (each of which is incorporated by reference for its above-noted teaching as well as its more specific below-characterized aspects):

European Pat. No. EP 0 787 398B1 (or related U.S. Applications), entitled "Automatic Telephone Dialing Device" directed to a device having a thin cross-section for automatically dialing stored telephone numbers for use in connection with a telephone handset;

U.S. Pat. No. 5,859,913, entitled "Method and System for the High-Speed Generation and Transmission of a Sequence of Characters by Means of Voice Frequencies" directed to the generation, by means of voice frequencies, of a sequence of several characters and the high speed transmission of those characters including the elimination, during transmission, of the blanks between two successive characters when the characters are distinct or encoded distinctly;

European Pat. No. 1 008 256B1 (or its equivalent U.S. Application), entitled "Method and System for Ensuring the Security of Service Supplies Broadcast on a Computer Network of Internet Type" directed to enabling users of an Internet type computer network provided with multimedia terminals, remotely located from a service supplier, to accede rapidly and safely to services offered by this service supplier;

U.S. Pat. No. 6,445,780, entitled "Method and System for Ensuring the Security of Telephone Call Management Centers" directed to enabling a center managing telephone calls to different suppliers of services to identify safely and rapidly the customers of the service suppliers calling the center by means of telephone equipment connected to a communication network; and U.S. Pat. No. 6,377,670, entitled "Method and System for Ensuring the Security of the Supply of Services of Telecommunication Operators" directed to enabling a telecommunication operator to identify rapidly and to debit in complete security the accounts of subscribers of a telephone network.

For some implementations, each feature disclosed in this specification (including any accompanying claims, abstract, and drawings), may be replaced by and/or implemented with alternative features having the same, equivalent or similar application, unless expressly stated otherwise. Thus, unless expressly stated otherwise, each feature disclosed is one example only of a generic series of equivalent or similar features.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. A method for conducting a business transaction involving personal transaction cards and a financial transaction between a seller and a buyer, the method comprising:
   programming, on a first transaction card, authentication data and account information for the buyer;
   programming, on a second transaction card, authentication data and account information for the seller;
   in connection with the business transaction, communicating the authentication data and account information from both the first transaction card and the second transaction card using sound waves in the form of encoded tones;
   converting the sound waves from both the first and second transaction cards to an electronic form of the audio information representing the authentication data;
   authorizing the business transaction as a function of the authentication data in the electronic form and the financial transaction; and
   sending a receipt for the authorized business transaction to a mobile device associated with the account information.

2. The method of claim 1, wherein communicating the audio information with the transaction cards further includes communicating, as encoded DTMF tones, at least one of:
   encoded authorization information;
   encoded security information; and
   encoded encrypted information.

3. The method of claim 1, wherein the communication of the audio information is implemented for providing transaction card information, in an encrypted form, from which to facilitate the business transaction; and wherein the sending of receipt includes sending the receipt as a text message and to a mobile telephone associated with the account information.

4. The method of claim 3, wherein communicating the information on the cards includes communicating the audio information as inaudible sound waves and to a hand-held audio device configured and arranged for communicating the audio information to a banking institution.

5. The method of claim 1, wherein the audio information includes an authorization code and wherein authorizing the business transaction as a function of the communicated audio information includes authorizing the business transaction as a function of the authorization code.

6. The method of claim 1, wherein authorizing the business transaction as a function of the communicated audio information includes authorizing the business transaction when the communicated seller information matches merchant information for a merchant involved in the transaction.

7. The method of claim 1, wherein programming information with the first transaction card includes programming unique identification information, and wherein the method further includes:
   at a remote server, associating customer information with the unique identification information; and
   wherein authorizing the business transaction as a function of the communicated audio information includes using the unique identification information for retrieving the associated customer information and authorizing the business transaction as a function of the associated customer information.

8. The method of claim 1, further comprising:
   entering transaction pricing information into the second card; and
   in connection with the business transaction, communicating transaction pricing information from the second transaction card using sound waves in the form of encoded tones; and
   converting the sound waves from both the first and the second transaction cards to an electronic form of the audio information representing the transaction pricing information.

9. The method of claim 1, wherein authorizing the business transaction as a function of the communicated information includes:
   communicating at least a portion of the information to a financial institution; and
   in response to the financial institution providing authorization information, authorizing the business transaction.

10. The method of claim 1, further comprising:
    entering customer identification information into the first transaction card;
    comparing the customer identification information with stored identification information on the first transaction card;
    providing, to the seller, a digital image of a customer associated with the customer identification; and
    wherein authorizing the business transaction as a function of the communicated audio information includes authorizing the business transaction as a function of the communicated information and the entered customer identification information.

11. A system for processing business transactions and financial transactions between sellers and buyers, the system comprising:
    a seller transaction card programmed with information representing digital data, the digital data including account information for a seller associated with the seller transaction card;
    a retailer transaction card programmed with information representing digital data, the digital data including account information for a retailer associated with the retailer transaction card;
    means for communicating, in connection with a particular business transaction and a particular financial transaction, the information from the seller and retailer transaction cards using sound waves having tones encoded to convey the digital data; and
    means for authorizing the business transaction as a function of the communicated audio information, the digital data and the financial transaction.

12. A system for processing business transactions and financial transactions between two parties, the system comprising:

- a first transaction card programmed with audio information that is frequency encoded and that represents account information for an account held by one of the two parties;
- a second transaction card programmed with audio information that is frequency encoded and that represents account information for another account held by the other of the two parties;
- a transaction card reader for communicating, in connection with a particular business transaction and a particular financial transaction using the accounts held by the two parties, the audio information from the transaction cards; and
- a transaction processing arrangement for authorizing the business transaction as a function of the communicated audio information and the financial transaction and for providing a transaction receipt to a mobile device associated with the account of at least one of the two parties.

13. The system of claim 12, wherein the first transaction card is configured and arranged for storing audio information in response to an access code.

14. The system of claim 12, wherein the first transaction card is configured and arranged for facilitating the communication of the audio information in response to an access code.

15. The system of claim 12, further comprising:

- a user terminal including the transaction card reader and adapted to audibly communicate the audio information; and
- a retailer terminal including the transaction processing arrangement and configured and arranged for receiving the audibly communicated audio information and for displaying an authorization of the business transaction in response to authorization information received from the transaction processing arrangement.

16. The system of claim 15, wherein the retailer terminal is adapted to communicate the audio information to a financial institution and, in response to the financial institution providing an authorization for the communicated audio information, authorizing the business transaction.

17. The method of claim 1, wherein programming audio information includes storing audio information in a wireless telephony device configured and arranged for communicating the audio information for use in the business transaction.

18. The system of claim 12, wherein the transaction card reader includes a wireless telephony device.

* * * * *